Patented Mar. 15, 1949

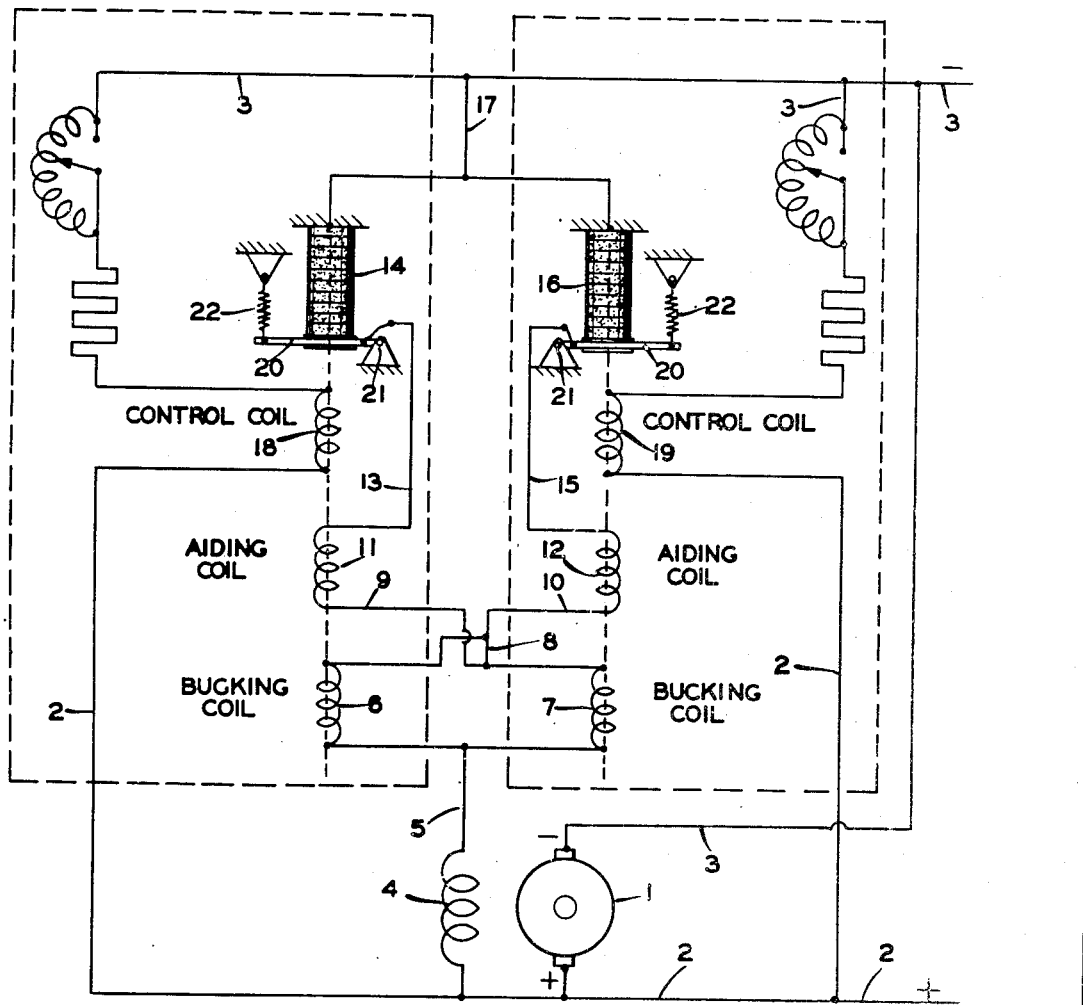

2,464,439

UNITED STATES PATENT OFFICE 2,464,439

STABILIZING NETWORK FOR CARBON PILE VOLTAGE REGULATORS

Earle Rhea Davis, West Englewood, N. J., assignor to Bendix Aviation Corporation, Teterboro, N. J., a corporation of Delaware Application July 30, 1947, Serial No. 764,847

4 Claims. (Cl. 322—82)

1

The present application relates to a novel circuit for regulating the output voltage of a generator.

An object of the invention is to provide a regulating system for a generator having large field current, in which a pair of carbon pile regulators are parallel connected so that each regulator equally shares the generator field current and includes control coils so arranged as to prevent hunting of the respective regulators.

The above and other objects and features of the invention will appear more fully hereinafter from a consideration of the following description taken in connection with the accompanying drawing wherein one embodiment of the invention is illustrated by way of example.

The drawing is a schematic illustration of the novel control circuit.

Referring to the drawing, there is provided a generator 1 having output lines 2 and 3 and a field winding 4. The field winding 4 is connected at one end to the output line 2 while the opposite end of the field winding 4 is connected by a conductor 5 to one end of a pair of shunt connected coils 6 and 7. The opposite end of the coils 6 and 7 are connected by a tie in 8 from which leads conductors 9 and 10.

The conductor 9 leads to a coil 11, while the conductor 10 leads to a coil 12. The opposite end of the coil 11 is connected by a conductor 13 to one end of a variable resistance carbon pile element 14. The opposite end of the coil 12 is connected by a conductor 15 to one end of a variable resistance carbon pile element 16.

The other ends of the variable resistance carbon pile elements 14 and 16 are connected by a conductor 17 to the output line 3.

Further windings 18 and 19 are connected across the output lines 2 and 3. The windings 6, 11 and 18 and 7, 12 and 19 provide electromagnetic means which are so arranged in the respective carbon pile regulators as to control an armature 20 thereof and thereby the pressures applied to the carbon piles 14 and 16, as will be explained hereinafter. The regulators are shown diagrammatically in the drawing as including the armatures 20 pivoted at 21 and exerting a compressive force upon the respective carbon piles 14 and 16 under tension of springs 22. The springs 22 are arranged so as to balance the pull on the armatures 20 by the electromagnets 18 and 19 when energized by a line voltage having a predetermined value. The regulators are preferably of a type such as shown in the U. S. patent application Serial No. 570,002

2 of William G. Neild, filed December 27, 1944, now Patent No. 2,427,805, patented September 23, 1947.

Upon the resistance of the carbon pile 14 becoming unbalanced with respect to the resistance of the carbon pile 16, the coil 11 serves as a means for resetting the regulator control means or coil 18 in one sense, while the coil 12 serves as a means for resetting the second regulator control means or coil 19 in an opposite sense so as to in effect cause an increase in the resistance of the low resistance carbon pile and a decrease in the resistance of the other high resistance carbon pile to return the same to a balanced relation.

During normal balanced operation the electromagnetic force of the coils 6 and 7 oppose the force of the coils 11 and 12 and serve as means to nullify the resetting action of the coils 11 and 12 respectively, and the same are so arranged that during the aforenoted, unbalanced relation between the resistances of the carbon piles 14 and 16, the unbalanced relation between the electromagnetic forces exerted by the resetting means 11 and nullifying means 6, and the resetting means 12 and nullifying means 7 tends to effect a rebalancing of the regulating units, including the resistance of the carbon piles 14 and 16.

The windings 18 and 19 connected across the output lines 2 and 3 provide the main control for each of the respective regulators and govern the regulation thereof in accordance with the voltage of the lines 2 and 3. Coil 11 is wound in the same direction as coil 18 and is arranged to aid the action of coil 18; similarly coil 12 is wound in the same direction as coil 19 and is likewise arranged to aid the action of coil 19. Coil 6 is wound in the opposite direction to coils 11 and 18 and is arranged to exert an electromagnetic force which tends to counteract or buck the force exerted by coils 11 and 18; similarly coil 7 is wound in the opposite direction to coils 12 and 19 and is likewise arranged so as to tend to counteract or buck the force exerted by coils 12 and 19.

The regulators are so arranged that as the generator field current flows through coils 6 and 11 and 7 and 12 the amount of ampere turns developed in these coils is a function of the field current magnitude. Therefore, when each voltage regulator is assuming its share of the field current, the effects of coils 6 and 11 and 7 and 12 cancel out. However, at such time as one voltage regulator is assuming more or less than its share of the field current, the same causes each regulator to share the field current.

Without the tie in 8 when the generator field current is approaching its maximum value (i. e., with low generator speeds and increasing load) there is a tendency for the regulators to hunt.

However, by the addition of the tie in 8 such hunting may be eliminated.

It will be seen then that with the tie in 8, both coils 6 and 7 are connected in parallel so that the field current will be equally shared by each with the result that any sudden change in resistance of either carbon pile 14 or 16 will not disturb the balance between them in the network and hence cause hunting.

Likewise, while both coils 11 and 12 are connected in parallel, it will be seen that the equalization of current in these coils is dependent on the instantaneous resistance of its respective carbon piles 14 and 16.

The coils 6 and 11 and the coils 7 and 12 are arranged with the same ampere turns upon the regulators operating in a normal balanced relation. Thus the bucking coils normally cancel out the magnetic effect of the respective aiding coils 11 and 12 so as not to affect the regulatory effect of the main control windings 18 and 19.

However, if the resistance of one carbon pile 16 for example at any instant should be lower than the other 14 then the current passing through coil 11 and carbon pile 14 would be higher than coil 12 and carbon pile 16, consequently this portion of the network would be out of balance. However, coil 11 would have an excess of ampere-turns which were not cancelled out by coil 6, therefore the resistance of carbon pile 14 would automatically be increased by the effect of the aiding ampere turns of coil 18 and the network would again be balanced. This, is, of course, not true when the tie in 8 is not present, since in the latter event when the resistance of one pile is decreased relative to the other, the lower resistance pile would effect not only its aiding coil, but also the bucking coil of the other tending to cause further adjustment of both piles and resulting instability.

In the present invention, the latter instability is avoided by providing the tie in 8 so that the ampere turns of the parallel connected bucking windings 6 and 7 remain equal, irrespective of the adjustment of the piles 14 and 16 relative one to the other. The aiding winding through which there may be an increase or decrease in current relative to the other aiding winding then coacts with its bucking winding to effect adjustment of its carbon pile to bring the electromagnetic force of the aiding winding to a balanced relation to its bucking winding and thereby balances the resistance of the carbon pile regulators.

Although only one embodiment of the invention has been illustrated and described, various changes in the form and relative arrangements of the parts may be made to suit requirements.

What is claimed is:

1. A regulating system comprising, in combination, a source of electrical energy, means for controlling a function of the output of said source, a pair of regulating units connected in parallel for affecting said control means, a first regulator control means for one of said units and affected by the output of said source, a second regulator control means for the other of said units and affected by the output of said source, a first resetting means for said first regulator control means, a second resetting means for said second regulator control means, means nullifying said resetting means during normal balanced operation of said units, each of said resetting means connected in series with its corresponding regulating unit so that unbalanced operation of said regulating units causes an unbalanced relation between said resetting and nullifying means to effect a rebalancing of said regulating units.

2. The combination defined by claim 1 in which there is provided electromagnetic means for controlling each of the regulating units, the electromagnetic means for each of the regulating units including a main control winding connected across the output of the source of electrical energy, a second winding aiding the electromagnetic force of the main winding, a third winding bucking the electromagnetic force of the second winding, the third winding connected in series with said second winding and its corresponding regulating unit across the output of the source of electrical energy, the third winding connected in shunt relation to the third winding of the electromagnetic means for the other regulating unit, the electromagnetic force applied by one third winding equaling that of the other third winding at all times and the electromagnetic force of the second winding only during balanced operation of the regulating units so that during unbalanced operation of the regulating units a difference in the forces applied by the second and third windings causes a rebalancing of said regulating units.

3. A line voltage regulating system for a generator including an exciter field, comprising a pair of carbon pile regulators connected in parallel for controlling the excitation of said exciter field, each of said carbon pile regulators including an armature operatively connected thereto for varying the electrical resistance of the carbon pile, a spring biasing the armature so as to adjust the carbon pile in a direction to produce an increase in the exciter field current, a first electromagnetic winding tending to operate the armature in the opposite direction in response to an increase in the line voltage of the generator, a second electromagnetic winding, a third electromagnetic winding, said exciter field, third winding, second winding and carbon pile connected in series across the output of the generator, the third winding connected in shunt relation to the third winding of the other regulator so as to be equally affected by changes in the resistance of one or the other of said carbon pile regulators, the second winding aiding the electromagnetic force of the first winding, the third winding bucking the electromagnetic force of the second winding so as to nullify the electromagnetic force thereof during normal balanced operation of the carbon pile regulators, said second and third windings so arranged that an unbalancing of the resistance of the one carbon pile regulator with respect to the resistance of the other carbon pile regulator causes an unbalanced relation between the second winding and third winding which varies the electromagnetic force acting on the armature so as to reset the one unbalanced carbon pile regulator and return the same to a balanced relation with respect to the other carbon pile regulator.

4. A regulating system comprising, in combination, a source of electrical energy, means for controlling a function of the output of said source, a pair of variable resistance devices connected in parallel for affecting said control means, a first main electromagnetic coil to control the resistance of one of said variable resistance devices and affected by the output of said source, a second main electromagnetic coil to control the resistance of the other of said variable resistance devices and affected by the output of said source, a third coil to aid the electromagnetic force of said first main control coil, a fourth coil to aid the electromagnetic force of said second main control coil, a fifth coil to buck the electromagnetic force of said third coil, a sixth coil to buck the electromagnetic force of said fourth coil, said third coil connected in series with one of said resistance devices and the fourth coil connected in series with the other of said resistance devices, and said fifth and sixth coils connected in parallel relation one to the other and in series relation with said resistance devices and said third and fourth coils so that upon the resistance of said variable resistance devices becoming unbalanced there may be effected an unbalanced relation between said third and fourth coils tending to effect a rebalancing of the resistance of said variable resistance devices.

EARLE RHEA DAVIS.

No references cited.